US011249190B2

(12) United States Patent
Nishino et al.

(10) Patent No.: US 11,249,190 B2
(45) Date of Patent: Feb. 15, 2022

(54) LASER RADAR DEVICE AND METHOD FOR CONTROLLING FREQUENCY MODULATION

(71) Applicant: MITSUBISHI ELECTRIC CORPORATION, Tokyo (JP)

(72) Inventors: Yuichi Nishino, Tokyo (JP); Masaharu Imaki, Tokyo (JP); Shumpei Kameyama, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 209 days.

(21) Appl. No.: 16/612,269

(22) PCT Filed: Jun. 20, 2017

(86) PCT No.: PCT/JP2017/022684
§ 371 (c)(1),
(2) Date: Nov. 8, 2019

(87) PCT Pub. No.: WO2018/235160
PCT Pub. Date: Dec. 27, 2018

(65) Prior Publication Data
US 2021/0156999 A1 May 27, 2021

(51) Int. Cl.
*G01C 3/08* (2006.01)
*G01S 17/34* (2020.01)
(Continued)

(52) U.S. Cl.
CPC .............. *G01S 17/34* (2020.01); *G01S 7/481* (2013.01); *G01S 7/4911* (2013.01); *G01S 7/4915* (2013.01)

(58) Field of Classification Search
CPC ........ G01S 17/34; G01S 7/481; G01S 7/4911; G01S 7/4915
See application file for complete search history.

(56) References Cited

U.S. PATENT DOCUMENTS

| 4,846,571 A | 7/1989 | Jelalian et al. |
| 5,289,252 A * | 2/1994 | Nourrcier ............... G01S 7/497 356/28.5 |

(Continued)

FOREIGN PATENT DOCUMENTS

| JP | 7-55925 A | 3/1995 |
| JP | 9-211128 A | 8/1997 |

(Continued)

OTHER PUBLICATIONS

International Search Report, issued in PCT/JP2017/022684, dated Sep. 26, 2017.

(Continued)

*Primary Examiner* — Mark Hellner
(74) *Attorney, Agent, or Firm* — Birch, Stewart, Kolasch & Birch, LLP

(57) ABSTRACT

The laser radar device includes: a modulated light generator configured to generate modulated laser light using frequency modulation based on a control parameter; an optical combiner configured to combine the received light and the local light to generate interference light; a photodetector configured to detect the interference light and output an electrical signal; a frequency-to-voltage converter configured to convert the electrical signal into a voltage signal; a characteristic calculator configured to measure a characteristic value of the voltage signal; an evaluator configured to evaluate, on a basis of the characteristic value, whether a center frequency of a spectrum of a return signal component is within a range of a demodulation band of a demodulation circuit; and a parameter setting unit configured to change the control parameter when it is evaluated that the center frequency is not within the range of the demodulation band.

15 Claims, 8 Drawing Sheets

(51) Int. Cl.
  *G01S 7/481*  (2006.01)
  *G01S 7/4911* (2020.01)
  *G01S 7/4915* (2020.01)

(56)          References Cited

U.S. PATENT DOCUMENTS

| | | |
|---|---|---|
| 5,748,295 A | 5/1998 | Farmer |
| 5,781,297 A * | 7/1998 | Castore ............. G01B 11/2441 356/486 |
| 2004/0130482 A1 | 7/2004 | Lin et al. |
| 2014/0186045 A1 | 7/2014 | Poddar et al. |

FOREIGN PATENT DOCUMENTS

| | | | |
|---|---|---|---|
| JP | 2001-41706 A | 2/2001 | |
| JP | 2006-215887 A | 8/2006 | |
| JP | 2008-39640 A | 2/2008 | |
| WO | WO201027151 A1 * | 11/2010 | ............... H01S 3/10 |

OTHER PUBLICATIONS

Japanese Office Action, issued in Application No. 2017-565884, dated Feb. 20, 2018.
Office Action dated Nov. 24, 2020 in corresponding European Patent Application No. 17 914 943.0.
Extended European Search Report issued in corresponding European Application No. 17914943.0 dated Mar. 24, 2020.

* cited by examiner

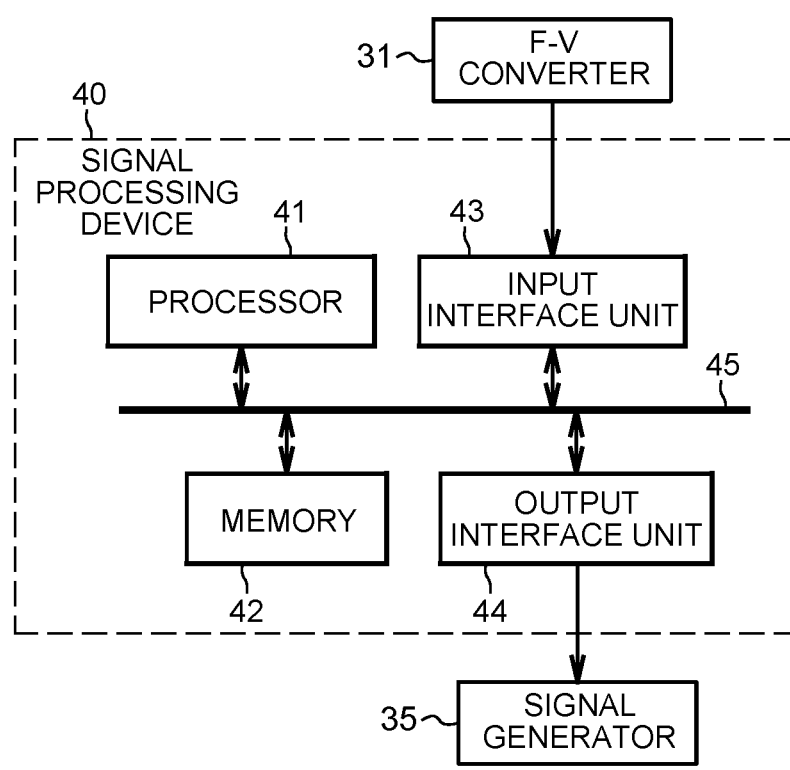

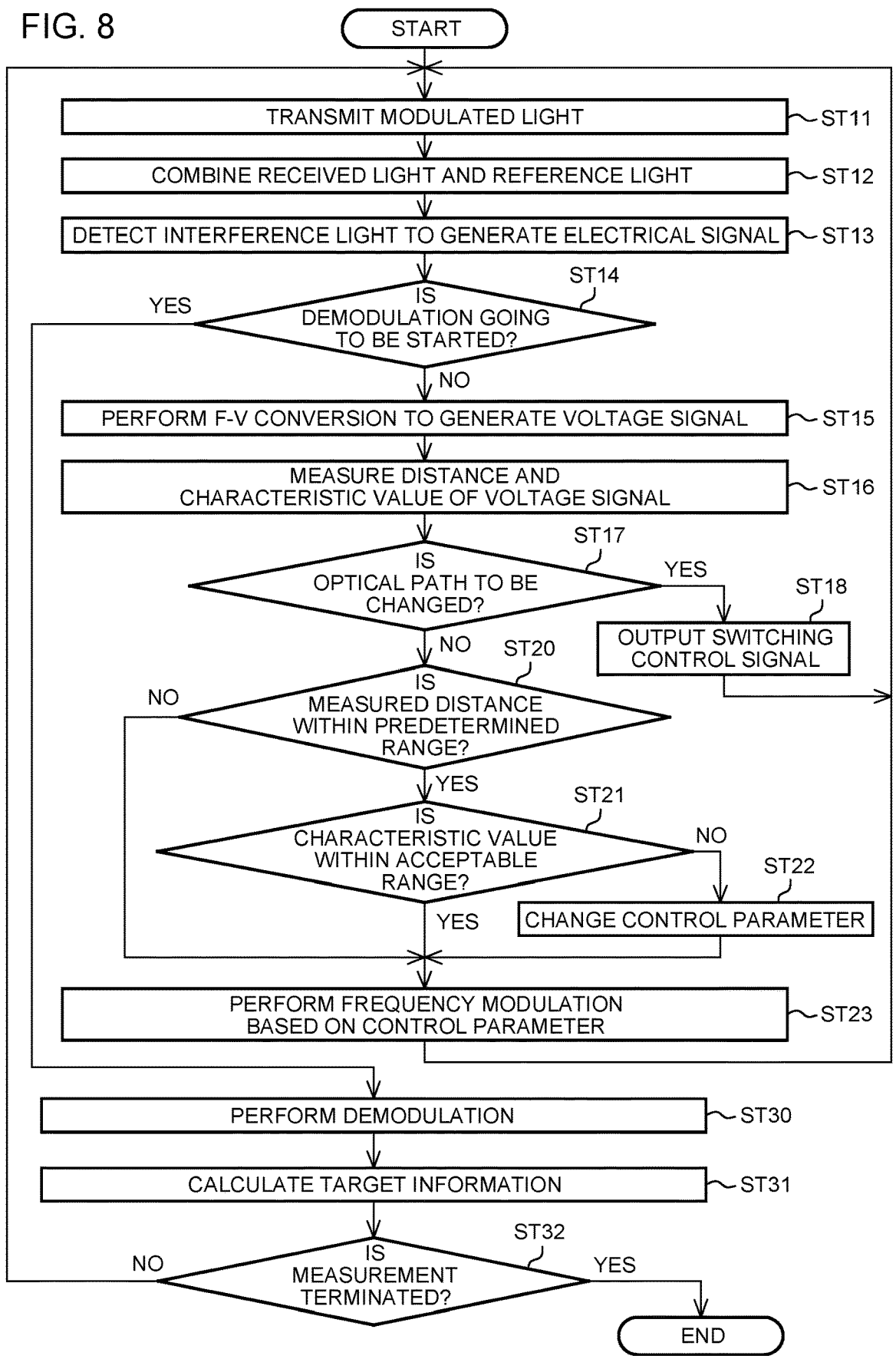

LASER RADAR DEVICE AND METHOD FOR CONTROLLING FREQUENCY MODULATION

TECHNICAL FIELD

The present invention relates to radar technologies, and more particularly to laser radar technologies capable of measuring target information such as measured values of distance using frequency-modulated laser light.

BACKGROUND ART

Typically, a frequency-modulated continuous wave (FMCW) radar device radiates a transmission wave, which is a frequency-modulated continuous wave (FMCW), into an external space, and receives the transmission wave reflected by a target existing in the external space. Such a radar device can measure a frequency difference between the received wave and the transmission wave, and detect target information such as the distance to the target on the basis of the frequency difference. Patent Literature 1 (Japanese Patent Application Publication No. 2008-039640) discloses an FMCW laser radar device (coherent lidar device) that detects a target using frequency-modulated continuous wave laser light as a transmission wave.

A conventional laser radar device as disclosed in Patent Literature 1 includes: a frequency shifter for shifting only the frequency of received light scattered by the target; an optical coupler for combining output light of the frequency shifter and local light; an optical receiver for performing heterodyne detection of composite light output from the optical coupler; a filter for filtering only a beat signal component of an electrical output signal of the optical receiver; and an FM demodulator for performing demodulation on an output of the filter. In this conventional laser radar device, the filter substantially shuts off internally reflected light components and filters return signal components (the received, scattered light components with a small Doppler shift frequency, or the received, scattered light component from a stationary target). Therefore, the FM demodulator can perform demodulation on the return signal component separated from the internally reflected light component.

CITATION LIST

Patent Literature

Patent Literature 1: Japanese Patent Application Publication No. 2008-039640 (for example, FIG. 4 and paragraphs [0025] to [0029])

SUMMARY OF INVENTION

Technical Problem

However, the frequency of the return signal component from the target possibly changes depending on the state of the target (for example, accelerated motion or vibration of the target). Therefore, in the above-described conventional laser radar device, due to the performance limit of the demodulation band (frequency band in which demodulation is permissible) of the FM demodulator, the frequency of the return signal component from the target may not fall within the demodulation band of the FM demodulator. Such a state causes the problem with laser radar device that the measurement of target information fails because the FM demodulator cannot demodulate the return signal component.

In view of the above, it is an object of the present invention to provide a laser radar device and method for controlling frequency modulation, which enable high-accuracy measurement of target information even when there is a performance limit in the demodulation band.

Solution to Problem

In accordance with an aspect of the present invention, there is provided a radar laser device which includes: a modulated light generator configured to generate modulated laser light using frequency modulation based on a control parameter; an optical splitter configured to split the modulated laser light into transmission light and local light; an optical system for transmission and reception configured to transmit the transmission light into an external space and receive, as received light, the transmission light reflected by a target existing in the external space; an optical combiner configured to combine the received light and the local light to generate interference light; a photodetector configured to detect the interference light and output an electrical signal; a demodulation circuit configured to demodulate the electrical signal output from the photodetector; a frequency-to-voltage converter configured to convert the electrical signal output from the photodetector into a voltage signal having a signal voltage corresponding to a frequency of the electrical signal; a characteristic calculator configured to measure a characteristic value of the voltage signal; an evaluator configured to evaluate, on a basis of the characteristic value, whether a center frequency of a return signal component of the electrical signal is within a range of a demodulation band of the demodulation circuit; and a parameter setting unit configured to change the control parameter when the evaluator evaluates that the center frequency is not within the range of the demodulation band.

Advantageous Effects of Invention

According to the present invention, by change of the control parameter, the center frequency of a return signal component from the target can fall within the demodulation band. Therefore, even if a performance limit exists in the demodulation band of the demodulation circuit, the target information can be measured with high accuracy.

BRIEF DESCRIPTION OF DRAWINGS

FIG. 5 is a diagram schematically showing an example hardware configuration of the laser radar device of the first embodiment.

FIG. 8 is a schematic flowchart diagram illustrating an exemplary procedure of a measurement operation according to the second embodiment.

DESCRIPTION OF EMBODIMENTS

Figure 1:
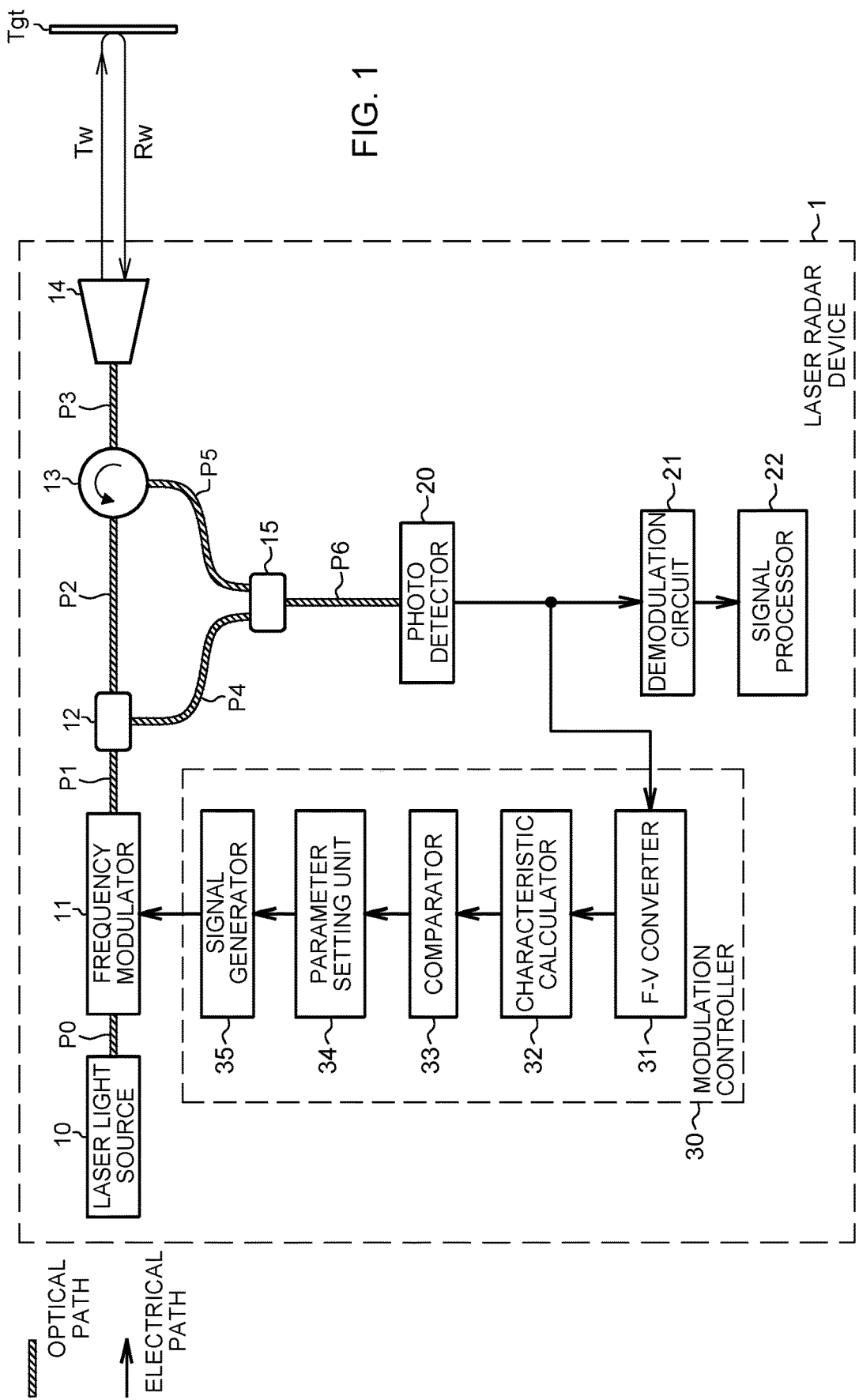
FIG. 1 is a diagram schematically showing a configuration of a laser radar device of a first embodiment according to the present invention.

Hereinafter, various embodiments according to the present invention will be described in detail with reference to the drawings. Note that components given the same reference numerals throughout the drawings have the same configuration and the same function.

First Embodiment

FIG. 1 is a block diagram showing a schematic configuration of a laser radar device 1 of a first embodiment according to the present invention. As shown in FIG. 1, the laser radar device 1 includes: a modulated light generator including a laser light source 10 and a frequency modulator 11; an optical splitter 12 configured to split FMCW laser light (frequency-modulated continuous wave laser light) output from the frequency modulator 11 into transmission light and reference light (local light); an optical antenna (optical system for transmission and reception) 14 which is a transmitting and receiving optical system configured to transmit transmission light Tw input from the optical splitter 12 via an optical circulator 13 toward an external space; the optical circulator 13 configured to output received return light input from the optical antenna 14 to an optical combiner 15; the optical combiner 15 configured to combine the received return light and the reference light; and a photodetector 20 that detects interference light output from the optical combiner 15 to generate an electrical signal. For example, an optical coupler may be used as the optical splitter 12. A four-port optical coupler may be used as the optical combiner 15, for example.

As shown in FIG. 1, the light output end of the laser light source 10 and the light input end of the frequency modulator 11 are connected to each other by an optical path P0. The light output end of the frequency modulator 11 and the light input end of the optical splitter 12 are connected to each other by an optical path P1, the light output end of the optical splitter 12 and the light input end of the optical circulator 13 are connected to each other by an optical path P2, and the light input/output port of the optical circulator 13 and the light input end of the optical antenna 14 are connected to each other by an optical path P3. Furthermore, the other light output end of the optical splitter 12 and the light input end of the optical combiner 15 are connected to each other by an optical path P4, the light output port of the optical circulator 13 and the other light input end of the optical combiner 15 are connected to each other by an optical path P5, and the light output end of the optical combiner 15 and the light input end of the photodetector 20 are connected to each other by an optical path P6. The optical paths P0 to P6 may be made of, for example, an optical transmission medium such as an optical fiber line.

For example, the laser light source 10 may be configured with an integrable tunable laser assembly (ITLA) or laser diode (LD). The frequency modulator 11 can generate FMCW laser light by modulating the frequency of the output laser light of the laser light source 10 on the basis of a control parameter specified by a modulation controller 30 as described later. Note that the modulated light generator of the present embodiment is configured with the combination of the laser light source 10 and the frequency modulator 11, although no limitation thereto is intended. Instead of the combination of the laser light source 10 and the frequency modulator 11, a modulated light generating circuit that generates the FMCW laser light by directly controlling the drive current of the laser light source may be used.

The optical antenna (optical system for transmission and reception) 14 can emit the transmission light input from the optical circulator 13 onto a target Tgt with a desired beam diameter and divergence angle. Further, the optical antenna 14 receives, as return light Rw, the transmission light Tw reflected back by the target Tgt existing in the external space, and outputs the received return light to the optical circulator 13. As the optical antenna 14, for example, optical components such as a collimator lens and a condenser lens may be used.

The optical circulator 13 is a nonreciprocal optical device with three ports. Specifically, the optical circulator 13 includes one light input port coupled to the optical splitter 12 via the optical path P2, one light input/output port coupled to the optical antenna 14 via the optical path P3, and one light output port coupled to the optical combiner 15 via the optical path P5. The optical circulator 13 outputs the transmission light incident on the light input port on the optical path P2 side from the light input/output port on the optical path P3 side, and does not output the transmission light from the light output port on the optical path P5 side. Further, the optical circulator 13 outputs the received return light incident on the light input/output port on the optical path P3 side from the light output port on the optical path P5 side, and does not output the received return light from the light input port on the optical path P2 side.

The photodetector 20 converts the interference light input from the optical combiner 15 into an electrical signal (beat signal), and outputs the electrical signal to the modulation controller 30 and a demodulation circuit 21. The photodetector 20 can be configured using, for example, a photo diode (PD), an avalanche photo diode (APD), or a balanced receiver incorporating a photoelectric conversion element.

As shown in FIG. 1, the laser radar device 1 includes: the demodulation circuit 21 that performs demodulation on the output signal of the photodetector 20 to generate a demodulation signal; a signal processor 22 configured to calculate target information on the basis of the demodulation signal; and a modulation controller 30 that controls frequency modulation in the frequency modulator 11. The signal processor 22 performs A/D-conversion to convert the demodulation signal input from the demodulation circuit 21 into a digital signal, performs digital signal processing on the digital signal, and thereby can calculate the distance to the target Tgt and target information such as the relative velocity, vibration frequency and displacement amount of the target Tgt.

As the demodulation circuit 21, for example, an FM detection circuit such as a quadrature detector, a ratio detector, or a Foster-Seeley Discriminator can be used.

A hardware configuration of the signal processor 22 may be implemented by, for example, a semiconductor integrated circuit such as a one-chip microcomputer, an application specific integrated circuit (ASIC), or a field-programmable gate array (FPGA). Alternatively, a hardware configuration of the signal processor 22 may be implemented by a semiconductor integrated circuit including a central processing unit (CPU) or graphics processing unit (GPU).

Next, the configuration of the modulation controller 30 will be described. As shown in FIG. 1, the modulation controller 30 includes an F-V converter (frequency-to-voltage converter) 31, a characteristic calculator 32, a comparator (evaluator) 33, a parameter setting unit 34, and a signal generator 35.

The F-V converter 31 is a circuit that converts the electrical signal output from the photodetector 20 into an analog voltage signal having a signal voltage corresponding to the frequency of the electrical signal. When an electrical signal with a beat frequency $f_b$ (unit: Hz) is input at a time instant, the F-V converter 31 can output an analog voltage signal having a signal voltage $V_m$ (unit: volt) proportional to the beat frequency $f_b$.

The characteristic calculator 32 performs A/D-conversion to convert the analog voltage signal input from the F-V converter 31 into a digital voltage signal (hereinafter referred to as "voltage signal"), and measures a characteristic value of the digital voltage signal. Specifically, the characteristic calculator 32 detects a frequency sweep time $t_s$ (unit: second) of the received return wave and the signal voltage $v_m$ corresponding thereto, and can calculate, the characteristic value, a slope "a" indicating a relationship between the sweep time $t_s$ and the signal voltage $V_m$. On the basis of the voltage signal, the characteristic calculator 32 can calculate the slope "a" (unit: second/volt) expressed by the following equation (1).

$$a = t_s/V_m \quad (1)$$

Figure 2:
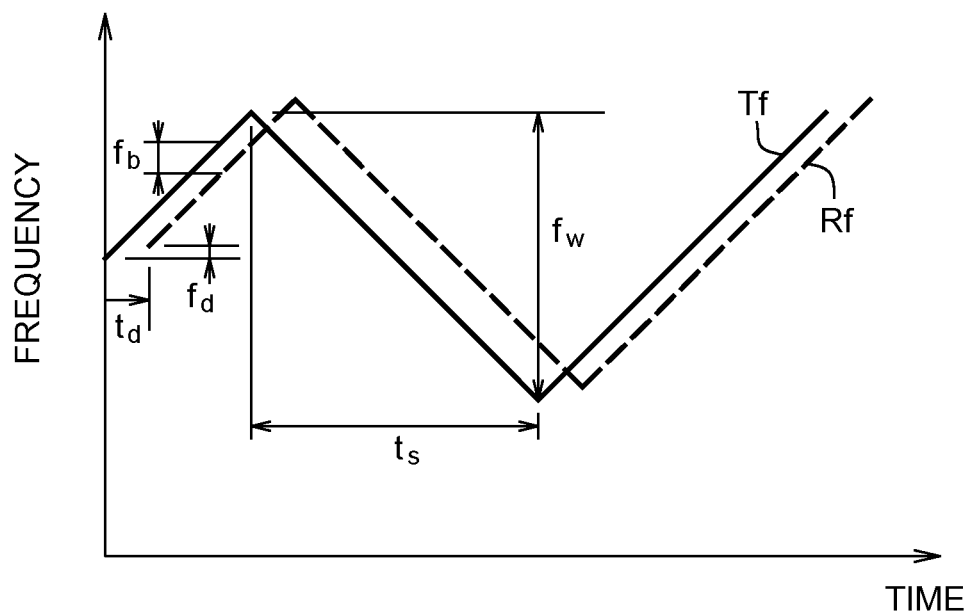
FIG. 2 is a graph illustrating a relationship between the frequency of a transmission wave and the frequency of a received wave in the first embodiment.

FIG. 2 is a graph showing an example of the relationship between the frequency Tf of the transmission wave and the frequency Rf of the received return wave corresponding thereto. The frequency modulator 11 operates in the frequency sweep mode, and as shown by the solid line in FIG. 2, the frequency Tf of the transmission wave is changed at a specified sweep rate ($= +f_w/t_s$ or $-f_w/t_s$) within the range between the lower limit frequency and the upper limit frequency. $f_w$ is the frequency shift width at the sweep time $t_s$, that is, the sweep frequency width. The frequency Rf of the received return wave changes as shown by the broken line in FIG. 2. $t_d$ is a delay time between the transmission wave and the received return wave, and $f_b$ is a beat frequency indicating a frequency difference between the transmission wave and the received return wave. Further, $f_d$ is a Doppler frequency (that is, a frequency shift amount between the average frequency of the transmission wave and the average frequency of the received return wave, shifted by the Doppler effect).

The delay time $t_d$ can be calculated according to the following equation (2).

$$t_d = (t_s/f_w) \times f_b \quad (2)$$

When the frequency-to-voltage conversion coefficient set in the F-V converter 31 is represented by $a_{FV}$ (unit: volt/Hz) and a voltage corresponding to the beat frequency $f_b$ is represented by $V_b$ (unit: volt), the beat frequency $f_b$ is given by the following equation (3).

$$f_b = V_b/a_{FV} \quad (3)$$

When the speed of light is represented by c, the distance L (unit: meter) to the target Tgt is expressed by the following equation (4).

$$L = c \times t_d/2 \quad (4)$$

The characteristic calculator 32 can calculate the distance L to the target Tgt using equations (2) to (4).

The comparator 33 evaluates, on the basis of the characteristic value such as the slope "a" as described above, whether the center frequency of the spectrum of the return signal component included in the output signal of the photodetector 20 is within the range of the demodulation band (frequency band in which demodulation is permissible) of the demodulation circuit 21, and provides the evaluation result to the parameter setting unit 34. Specifically, the comparator 33 can evaluate whether the characteristic value is within a predetermined numerical range corresponding to the demodulation band, to thereby evaluate whether the center frequency is within the range of the demodulation band. For example, the comparator 33 compares the slope "a" with the acceptable range represented by expression (5) below. The comparator 33 can evaluate that the center frequency is within the range of the demodulation band when the slope "a" is within the acceptable range, and otherwise, can evaluate that the center frequency is not within the range of the demodulation band.

$$t_s/V_A \le a \le t_s/V_C \quad (5)$$

In equation (5), $V_A$ and $V_C$ are a set of voltages corresponding to the demodulation band of the demodulation circuit 21.

The parameter setting unit 34 supplies a control parameter to control frequency modulation in the frequency modulator 11, to the signal generator 35. The parameter setting unit 34 can supply, for example, a control value specifying a sweep time $t_s$ that defines a frequency sweep rate, to the signal generator 35 as a control parameter. The internal memory of the parameter setting unit 34 stores a default value (initially set value) of the control parameter. The user can set this default value in advance.

The signal generator 35 generates, on the basis of the control parameter, a control signal for control of the frequency modulation in the frequency modulator 11, and supplies the control signal to the frequency modulator 11. As the signal generator 35, for example, a known signal generator or function generator can be used.

When the comparator 33 evaluates that the center frequency is within the range of the demodulation band, the parameter setting unit 34 does not change the set value of the control parameter. On the other hand, when the comparator 33 evaluates that the center frequency is not within the range of the demodulation band, the parameter setting unit 34 changes a set value of the control parameter so that the center frequency falls within the range of the demodulation band. Specifically, the parameter setting unit 34 can generate, as the set value of the control parameter, a control value for changing the sweep rate of the transmission wave frequency.

Figure 3:
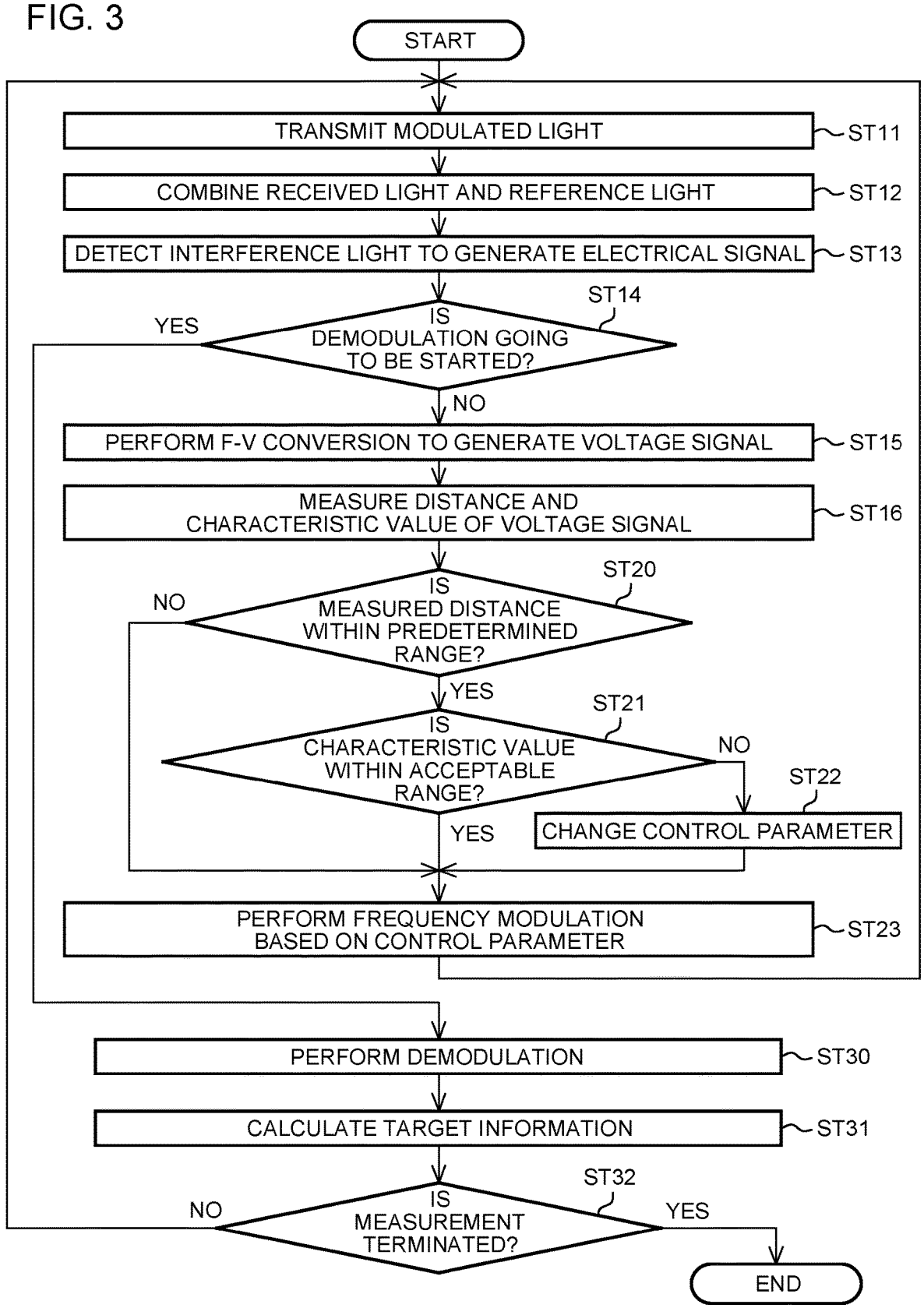
FIG. 3 is a schematic flowchart diagram illustrating an exemplary procedure of a measurement operation of the first embodiment.

Next, the procedure of a measurement operation, including a method for controlling frequency modulation according to the present embodiment, will be described with reference to FIG. 3. FIG. 3 is a schematic flowchart diagram illustrating an exemplary procedure of the measurement operation according to the first embodiment.

Referring to FIG. 3, first, the frequency modulator 11 frequency-modulates output laser light of the laser light source 10 to generate modulated light (FMCW laser light) (step ST11). As described above, part of this modulated light is transmitted from the optical antenna 14 toward the target Tgt. Thereafter, the received light (reflected light) propagated from the target Tgt is input to the optical combiner 15.

The optical combiner 15 combine the received light input from the optical circulator 13 with the reference light input from the optical splitter 12 to generate interference light (step ST12). The photodetector 20 detects the interference light input from the optical combiner 15 via the optical path P6 to generate an electrical signal (beat signal) (step ST13).

Thereafter, when starting demodulation (YES in step ST14), the demodulation circuit 21 performs the demodulation (step ST30), and the signal processor 22 calculates target information on the basis of the demodulation signal (step ST31). The timing when demodulation is started may be the timing when each reflected light beam Rw is received, or the timing after steps ST15, ST16, and ST21 to ST23 have been performed a certain number of times. Alternatively, demodulation may be started at a timing designated by the user.

When demodulation is not going to be started (NO in step ST14), the F-V converter 31 converts the electrical signal output from the photodetector 20 into a voltage signal having a signal voltage corresponding to the frequency of the electrical signal (step ST15). Then, the characteristic calculator 32 measures the distance L and the characteristic value of the voltage signal as described above (step ST16).

Next, in order to avoid frequency modulation control based on the internally reflected component reflected inside the laser radar device 1, the comparator 33 evaluates whether the measured distance L is within a predetermined range ΔR (step ST20). For example, when the measured distance L is equal to or larger than a predetermined threshold, or when the measured distance L is equal to or larger than a predetermined lower limit threshold and equal to or smaller than a predetermined upper limit threshold, the comparator 33 can evaluate that the measured distance L is within the predetermined range ΔR. If it is evaluated that the measured distance L is within the predetermined range ΔR (YES in step ST20), the comparator 33 further evaluates whether the characteristic value such as the slope "a" is within the acceptable range, to thereby evaluate whether the center frequency of the spectrum of the return signal component included in the output signal of the photodetector 20 is within the range of the demodulation band of the demodulation circuit 21 (step ST21). If it is evaluated that the characteristic value is within the acceptable range (YES in step ST21), the frequency modulator 11 performs frequency modulation based on the current control parameter (control parameter that is not changed) (step ST23). At this time, the parameter setting unit 34 does not change the set value of the current control parameter, and the signal generator 35 supplies a control signal based on the current control parameter to the frequency modulator 11. After step ST23, step ST11 is performed again.

On the other hand, when it is evaluated that the characteristic value is not within the acceptable range (NO in step ST21), the frequency modulator 11 performs frequency modulation based on the changed control parameter (steps ST22, ST23). In this case, the parameter setting unit 34 changes the control parameter so that the characteristic value falls within the acceptable range (step ST22). The signal generator 35 supplies a control signal based on the changed control parameter to the frequency modulator 11.

When it is evaluated in step ST20 that the measured distance L is not within the predetermined range ΔR (for example, when the measured distance L is less than the threshold), the comparator 33 causes the process to proceed to step ST23 to avoid frequency modulation control based on the internally reflected component, and thereby, can avoid the evaluation (step ST21) based on the internally reflected component. In the next step ST23, the comparator 33 evaluates whether the characteristic value such as the slope "a" is within the acceptable range. After that, step ST11 is performed again.

Figure 4A:
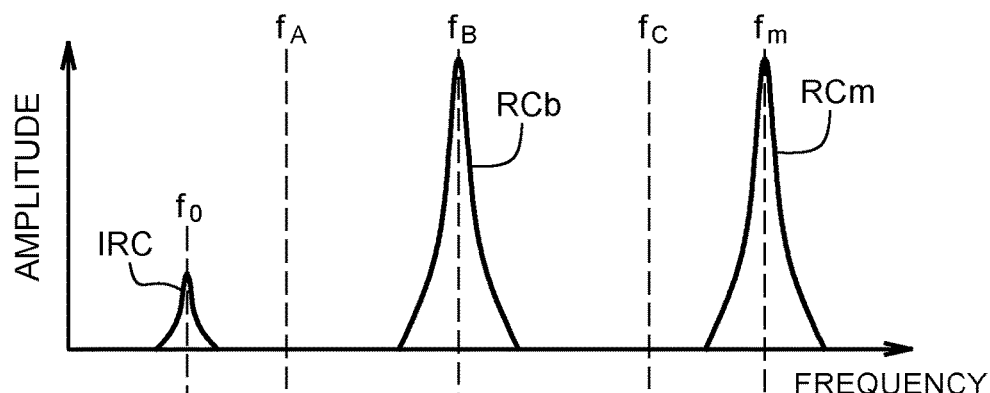
FIG. 4A and FIG. 4B are graphs for explaining frequency modulation control according to the first embodiment.
Figure 4B:
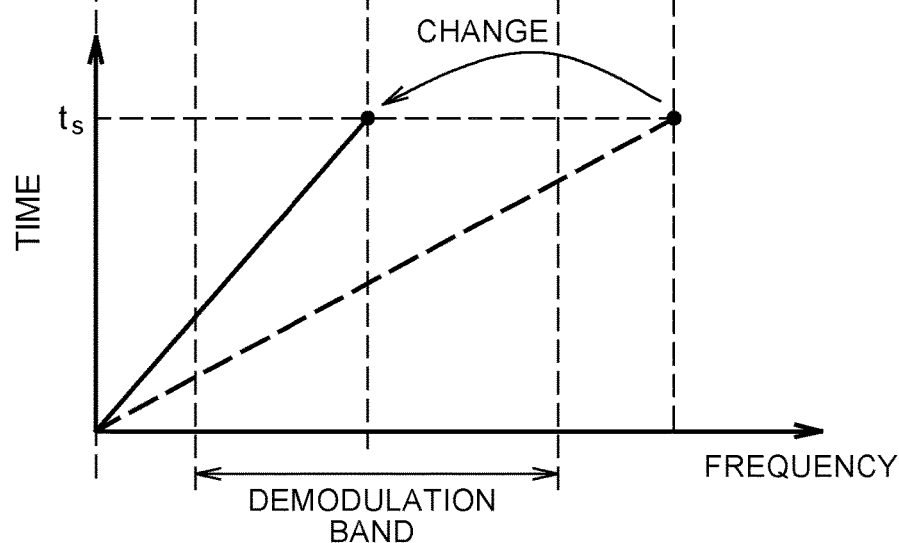

FIGS. 4A and 4B are graphs showing an example of the relationship between the spectrum of the beat signal and the sweep frequency. FIG. 4A shows the spectrum of the beat signal (where the horizontal axis indicates the frequency, and the vertical axis indicates the signal amplitude), and FIG. 4B shows change in sweep frequency of transmission wave (where the horizontal axis indicates the frequency, and the vertical axis indicates the time) by a solid line and a broken line. In this example, the center frequency $f_O$ of the internally reflected component IRC exists in the frequency range lower than the lower limit frequency of the demodulation band.

As shown in FIGS. 4A and 4B, the lower limit frequency $f_A$ and the upper limit frequency $f_C$ of the demodulation band of the demodulation circuit 21 exist. In this case, as shown in the above equation (5), an acceptable range defined by the voltages $V_A$ and $V_C$ respectively corresponding to the frequencies $f_A$ and $f_C$ can be set. When the slope "a" is within the acceptable range of equation (5), as shown in FIG. 4A, the center frequency $f_B$ of the return signal component RCb falls within the demodulation band. On the other hand, when the slope "a" is not within the acceptable range of equation (5), as shown in FIG. 4A, the center frequency $f_m$ of the return signal component RCm is not within the demodulation band. In such a case, the parameter setting unit 34 can, for example, set the sweep frequency width $f_w$ as a fixed value and generate a control parameter to change the delay time $t_d$, so that the slope "a" can be made to fall within the acceptable range.

Thereafter, when demodulation is started by the demodulation circuit 21 (YES in step ST14 and step ST30), the signal processor 22 calculates, on the basis of the demodulation signal, target information such as the motion frequency (vibration frequency) and displacement amount of the vibrating target Tgt (step ST31).

Specifically, the signal processor 22 calculates a frequency domain signal by performing discrete Fourier transform such as FFT (Fast Fourier Transform) on the demodulation signal in the time domain, and can detect a frequency (peak frequency) corresponding to a peak appearing in the spectrum (amplitude spectrum or power spectrum) of this frequency domain signal. The signal processor 22 can calculate the peak frequency as the motion frequency $f_s$ (unit: Hz) of the target Tgt.

Further, assuming that the displacement amount of the vibrating target Tgt is d (unit: meter) and the relative velocity of the target Tgt is v (unit: meter per second), the signal processor 22 can calculate the displacement amount d of the target Tgt in accordance with the following equation (6).

$$d=v/(2\pi f_s) \quad (6)$$

Also, assuming that the frequency shift amount (Doppler frequency) is $f_d$ (unit: Hz) and the laser wavelength is λ (unit: meter), the signal processor 22 can calculate the relative velocity v of the vibrating target Tgt in accordance with the following equation (7).

$$v=f_d \times \lambda/2 \quad (7)$$

Here, assuming that the output voltage of the demodulation circuit 21 is $V_{out}$ (unit: volt), the signal processor 22 can calculate the frequency shift amount $f_d$ in accordance with the following equation (8).

$$f_d=V_{out}/a_{FV} \quad (8)$$

After step ST31 as described above, when the measurement is terminated (YES in step ST32), the signal processor 22 stops the operation of the laser radar device 1. On the other hand, when the measurement operation is not terminated (NO in step ST32), the signal processor 22 performs step ST11 and subsequent steps again.

A hardware configuration of the modulation controller 30 as described above may be implemented by, for example, a semiconductor integrated circuit such as a one-chip microcomputer, ASIC or FPGA. Alternatively, a hardware configuration of the modulation controller 30 may be implemented by a semiconductor integrated circuit including a CPU or GPU.

FIG. 5 is a block diagram showing an example hardware configuration for implementation of the functions of the characteristic calculator 32, the comparator 33, and the parameter setting unit 34. A signal processing device 40 shown in FIG. 5 includes a processor 41 configured of a semiconductor integrated circuit, a memory 42, an input interface unit 43, an output interface unit 44, and a signal path 45. The signal path 45 is a bus for mutually connecting the processor 41, the memory 42, the input interface unit 43 and the output interface unit 44. The input interface unit 43 has a function to perform A/D-conversion to convert an analog voltage signal input from the F-V converter 31 into a digital voltage signal, and transferring the digital voltage signal to the processor 41 via the signal path 45. The processor 41 can output one or more control parameters to the signal generator 35 via the signal path 45 and the output interface unit 44.

The memory 42 is a data storage area used when the processor 41 performs frequency modulation control. When the processor 41 includes a CPU or GPU, the memory 42 is used as an area for storing a software program or firmware program for frequency modulation control to be executed by the CPU or GPU. As such a memory 42, a plurality of semiconductor memories such as ROM (Read Only Memory) and SDRAM (Synchronous Dynamic Random Access Memory) may be used.

As described above, in the laser radar device 1 of the first embodiment, the modulation controller 30 converts the output signal of the photodetector 20 into a voltage signal, and can evaluate, on the basis of the characteristic value of this voltage signal, whether the center frequency of the spectrum of the return signal component is within a range of the demodulation band of the demodulation circuit 21. The modulation controller 30 changes one or more control parameters when it is evaluated that the center frequency is not within the range of the demodulation band. As a result, the frequency of the return signal component from the target can fall in the demodulation band, so that even when the demodulation band of the demodulation circuit 21 has a performance limit, the signal processor 22 can measure the target information with high accuracy. In particular, it is possible to measure the vibration frequency and displacement amount of the vibrating target Tgt with high accuracy.

Further, in the present embodiment, it is not necessary to provide a frequency shifter between the optical antenna and the optical circulator as in the above-described conventional laser radar device. Therefore, in the present embodiment, since the optical antenna 14 and the optical circulator 13 can be directly connected to each other by an optical path such as an optical fiber line, the laser radar device 1 with high vibration resistance can be provided.

Furthermore, since the comparator 33 performs the evaluation (step ST21) only when the measured distance L is within the predetermined range (YES in step ST20), it is possible to avoid frequency modulation control based on the internally reflected signal from the inside such as the end face of the optical antenna 14. This enables frequency modulation control based only on the return signal component from the target Tgt.

Second Embodiment

Figure 6:
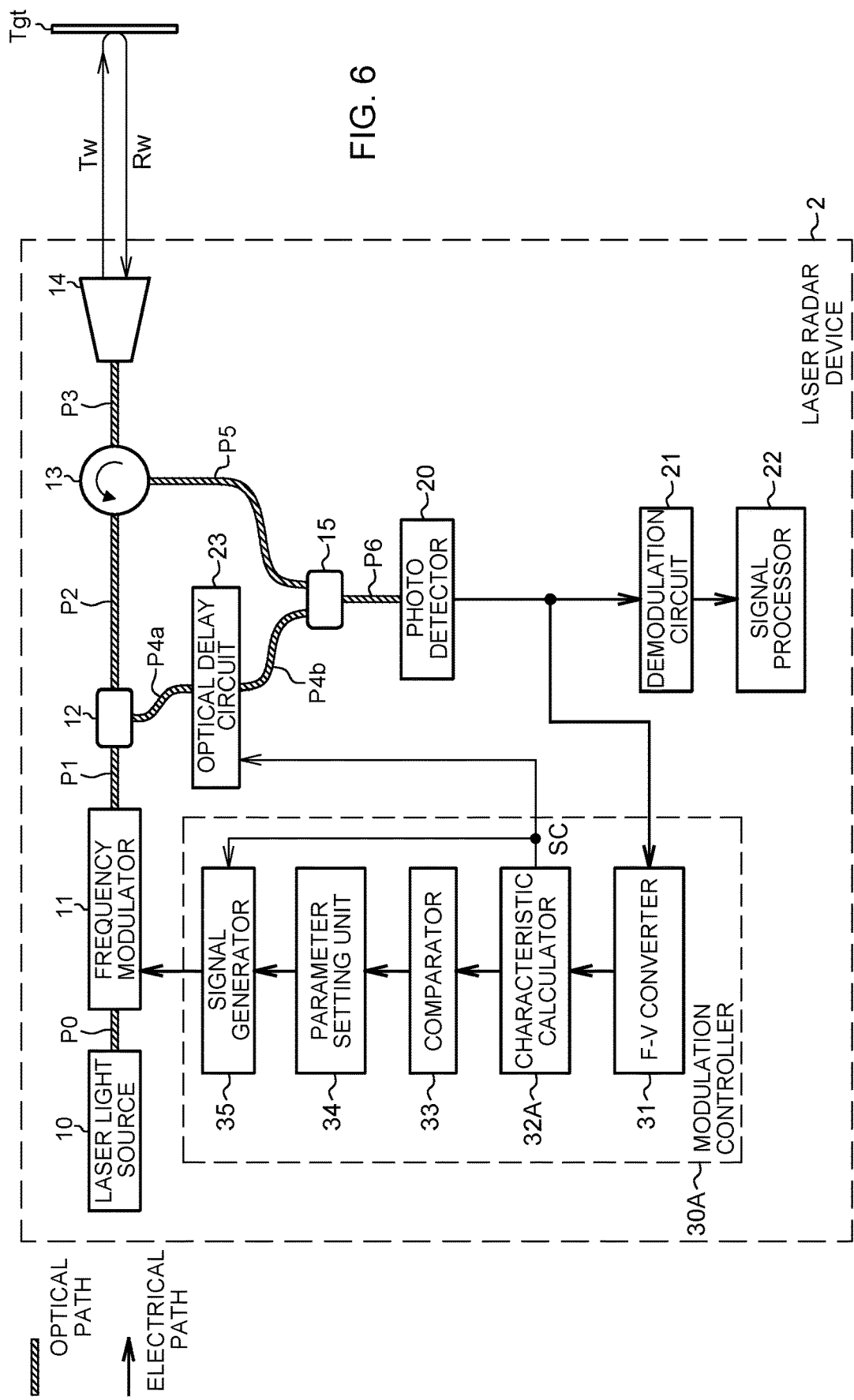
FIG. 6 is a diagram schematically showing a configuration of a laser radar device according to a second embodiment of the present invention.

Next, a second embodiment according to the present invention will be described. FIG. 6 is a block diagram showing a schematic configuration of a laser radar device 2 according to the second embodiment of the present invention. The laser radar device 2 of the present embodiment includes a modulation controller 30A and an optical delay circuit 23, as shown in FIG. 6. The modulation controller 30A includes an F-V converter 31, a characteristic calculator 32A, a comparator 33, a parameter setting unit 34, and a signal generator 35.

The configuration of the laser radar device 2 of the present embodiment is the same as that of the laser radar device 1 of the first embodiment except that it has the characteristic calculator 32A instead of the characteristic calculator 32 of the first embodiment and has the optical delay circuit 23.

The optical delay circuit 23 is interposed in optical paths P4a and P4b between the optical splitter 12 and the optical combiner 15, and has a plurality of optical fiber lines having different optical path lengths. The optical delay circuit 23 has a switch function to select an optical fiber line from among the optical fiber lines in response to a switching control signal SC from the characteristic calculator 32A, thereby equating a length $\Delta L1$ of an optical path starting from the optical splitter 12 and ending at the optical combiner 15 via the target Tgt, to a length $\Delta L2$ of the other optical path starting from the optical splitter 12 and ending at the optical combiner 15 via the optical delay circuit 23, and then, connect between the optical splitter 12 and the optical combiner 15 through the selected optical fiber line.

The characteristic calculator 32A has the same function as the characteristic calculator 32 of the first embodiment, and further generates a switching control signal SC on the basis of the value of the measured distance L, to select an optical fiber line that equates the two optical path lengths $\Delta L1$ and $\Delta L2$ to each other.

Figure 7:
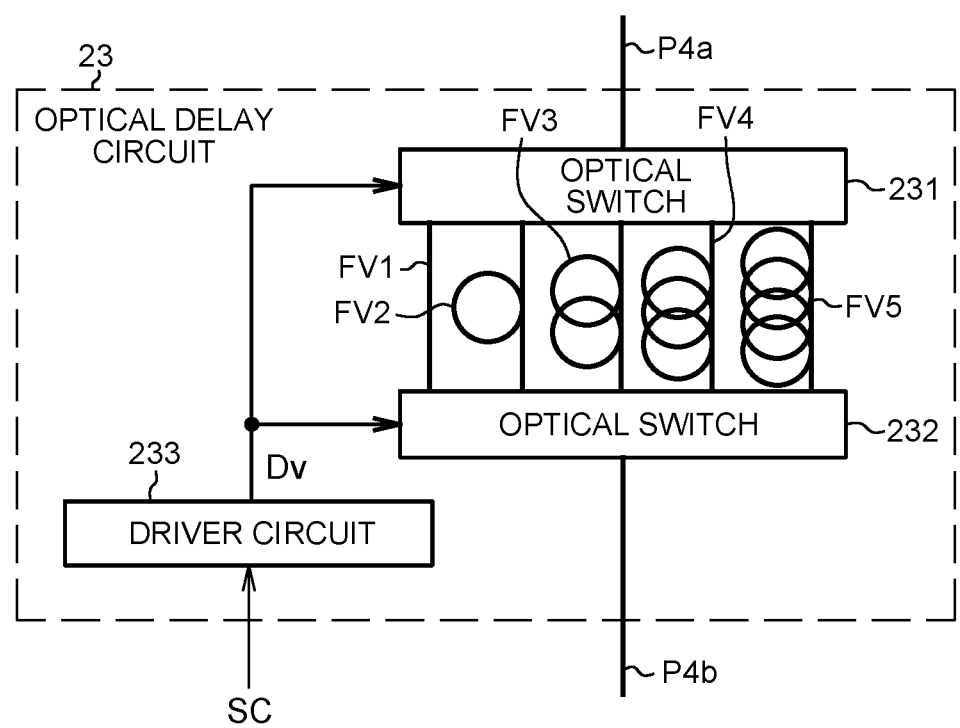
FIG. 7 is a diagram schematically showing an example configuration of an optical delay circuit in the second embodiment.

FIG. 7 is a diagram schematically showing the configuration of the optical delay circuit 23. As shown in FIG. 7, the optical delay circuit 23 includes: an optical switch 231 coupled to an end of the optical path P4a; an optical switch 232 coupled to an end of the optical path P4b; five optical fiber lines FV1 to FV5 arranged in parallel between the optical switches 231 and 232; and a driver circuit 233 configured to control the switching operations of the optical switches 231 and 232. The optical fiber lines FV1 to FV5 have different optical path lengths. In the example of FIG. 7, the number of optical fiber lines FV1 to FV5 is five with no limitation thereto being intended. The configuration of the optical delay circuit 23 can be modified to have two to four optical fiber lines or six or more optical fiber lines. The driver circuit 233 designates one optical fiber line FVk from among the optical fiber lines FV1 to FV5 in response to the switching control signal SC, and controls the switching operations of the optical switches 231 and 232 to connect between the optical paths P4a and P4b through the optical fiber line FVk. The optical switches 231 and 232 operate to allow light to pass through only the optical fiber line FVk and shut off light that passes through other optical fiber lines. The user can select a predetermined optical fiber line in advance.

Next, the procedure of a measurement operation, including a method for controlling frequency modulation according to the present embodiment, will be described with reference to FIG. 8. FIG. 8 is a schematic flowchart diagram illustrating an exemplary procedure of the measurement operation according to the second embodiment. The operation of the flowchart of FIG. 8 is the same as the operation of the flowchart of FIG. 3 except for steps ST17 and ST18.

After the distance L and the characteristic value of the voltage signal are measured in step ST16, the characteristic calculator 32A determines whether the optical path in the optical delay circuit 23 is to be changed, on the basis of the value of the measured distance L (step ST17). For example, when the difference between the length ΔL1 of the optical path including the target Tgt and the length ΔL2 of another optical path including the optical delay circuit 23 is within a preset acceptable range, the characteristic calculator 32A can determine that the optical path is not to be changed (NO in step ST17). On the other hand, when the difference between the lengths ΔL1 and ΔL2 of the optical paths is not within the preset acceptable range, the characteristic calculator 32A can determine that the optical path is to be changed (YES in step ST17). When it is determined that the optical path is not to be changed (NO in step ST17), step ST20 is performed.

On the other hand, when it is determined that the optical path is to be changed (YES in step ST17), the characteristic calculator 32A makes the optical path lengths ΔL1 and ΔL2 substantially equal to each other, that is, outputs the switching control signal SC for selecting the optical fiber line FVk that makes the optical path difference between the optical path lengths ΔL1 and ΔL2 fall within the acceptable range (step ST18). Thereafter, step ST11 is performed.

The characteristic calculator 32A can select the optical fiber line FVk to obtain the optical path length ΔL2 closest to the value of the measured distance L on the basis of the measured distance L. Here, the relationship between the actual length $L_e$ (unit: meter) of the optical fiber line FVk, optical path length ΔL2, and refractive index $n_f$ of the optical path with respect to the laser wavelength can be expressed by the following equation (9).

$$L_e = \Delta L2/n_f \quad (9)$$

When long distance measurement is performed, a situation may occur where the received return light and the reference light do not easily interfere with each other. Even in such a situation, the laser radar device 2 of the present embodiment can switch the path length for transmission of the reference light in response to the value of the measured distance L. Thus, even when the distance to the target Tgt is not known in advance, the signal processor 22 can measure the target information with high accuracy. Furthermore, even when a low coherency light source is used, it is possible to measure the vibration of the target Tgt placed at a long distance.

As mentioned above, although various embodiments according to the present invention have been described with reference to the drawings, these embodiments are merely examples of the present invention, and there can be various embodiments other than those embodiments.

Within the scope of the present invention, free combinations of the first and second embodiments, modification of any component of each embodiment, or omission of any component of each embodiment are possible.

INDUSTRIAL APPLICABILITY

The laser radar device according to the present invention is suitable for use in a radar system that measures target information such as a distance to a target and a vibration frequency, using frequency-modulated laser light.

REFERENCE SIGNS LIST

1, 2: laser radar devices; 10: a laser light source; 11: a frequency modulator; 12: an optical splitter; 13: an optical circulator; 14: an optical antenna; 15: an optical combiner; 20: a photodetector; 21: a demodulation circuit; 22: a signal processor; 23: an optical delay circuit; 231, 232: optical switches; 233: a driver circuit; 30, 30A: modulation controllers; 31: an F-V converter (frequency-to-voltage converter); 32, 32A: characteristic calculators; 33: a comparator (evaluator); 34: a parameter setting unit; 35: a signal generator; 40: a signal processing device; 41: a processor; 42: a memory; 43: an input interface unit; 44: an output interface unit; 45: a signal path; Tgt: a target; P0 to P6, P4a, P4b: optical paths; and FV1 to FV5: optical paths (optical fiber lines).

The invention claimed is:

1. A laser radar device comprising:
a modulated light generator configured to generate modulated laser light using frequency modulation based on a control parameter;
an optical splitter configured to split the modulated laser light into transmission light and local light;
an optical antenna configured to transmit the transmission light into an external space and receive, as received light, the transmission light reflected by a target existing in the external space;
an optical combiner configured to combine the received light and the local light to generate interference light;
a photodetector configured to detect the interference light and output an electrical signal;
a demodulation circuit configured to demodulate the electrical signal output from the photodetector;
a frequency-to-voltage converter configured to convert the electrical signal output from the photodetector into a voltage signal having a signal voltage corresponding to a frequency of the electrical signal;
a characteristic calculator configured to measure, as a characteristic value of the voltage signal, a slope indicating a relationship between a frequency sweep time of the frequency modulation and the signal voltage;
an evaluator configured to evaluate whether the characteristic value is within an acceptable range corresponding to a demodulation band of the demodulation circuit; and
a parameter setting unit configured to change the control parameter when the evaluator evaluates that the characteristic value is not within the acceptable range.

2. The laser radar device according to claim 1, wherein:
the modulated light generator is configured to perform the frequency modulation by changing a frequency of the modulated laser light at a specified sweep rate; and
the parameter setting unit is configured to generate, as the control parameter, a control value for changing the specified sweep rate when the evaluator evaluates that the characteristic value is not within the acceptable range.

3. The laser radar device according to claim 2, wherein the control value is a value specifying the frequency sweep time.

4. The laser radar device according to claim 1, further comprising a signal processor configured to calculate at least one of a vibration frequency and a displacement amount of the target on a basis of an output of the demodulation circuit.

5. The laser radar device according to claim 1, further comprising an optical delay circuit which includes a plurality of optical fiber lines having different optical path lengths and is interposed in an optical path between the optical splitter and the optical combiner, wherein:
the characteristic calculator is configured to measure the distance to the target on a basis of the voltage signal; and
the optical delay circuit is configured to select an optical fiber line corresponding to a measured value of the distance from among the plurality of optical fiber lines, and connect between the optical splitter and the optical combiner through the selected optical fiber line.

6. The laser radar device according to claim 5, wherein the optical delay circuit is configured to select an optical fiber line from among the plurality of optical fiber lines, thereby equating a length of an optical path starting from the optical splitter and ending at the optical combiner via the target, to a length of an optical path starting from the optical splitter and ending at the optical combiner via the optical delay circuit.

7. The laser radar device according to claim 5, wherein the optical delay circuit includes:
a driver circuit configured to designate an optical fiber line corresponding to the measured value of the distance from among the plurality of optical fiber lines; and
an optical switch configured to allow light to pass through the designated optical fiber line and shut off light that passes through one or more optical fiber lines other than the designated optical fiber line among the plurality of optical fiber lines.

8. A method for controlling frequency modulation to be performed in a laser radar device which includes: a modulated light generator configured to generate modulated laser light using frequency modulation based on a control parameter; an optical splitter configured to split the modulated laser light into transmission light and local light; an optical antenna configured to transmit the transmission light into an external space and receive, as received light, the transmission light reflected by a target existing in the external space; an optical combiner configured to combine the received light and the local light to generate interference light; a photodetector configured to detect the interference light and output an electrical signal; a demodulation circuit configured to demodulate the electrical signal output from the photodetector; and a frequency-to-voltage converter configured to convert the electrical signal output from the photodetector into a voltage signal having a signal voltage corresponding to a frequency of the electrical signal, the method comprising:
measuring, as a characteristic value of the voltage signal, a slope indicating a relationship between a frequency sweep time of the frequency modulation and the signal voltage;
evaluating whether the characteristic value is within an acceptable range corresponding to a demodulation band of the demodulation circuit; and
changing the control parameter when the characteristic value is evaluated not to be within the acceptable range.

9. A laser radar device comprising:
a modulated light generator configured to generate modulated laser light using frequency modulation based on a control parameter;
an optical splitter configured to split the modulated laser light into transmission light and local light;
an optical antenna configured to transmit the transmission light into an external space and receive, as received light, the transmission light reflected by a target existing in the external space;
an optical combiner configured to combine the received light and the local light to generate interference light;
a photodetector configured to detect the interference light and output an electrical signal;
a demodulation circuit configured to demodulate the electrical signal output from the photodetector;
a frequency-to-voltage converter configured to convert the electrical signal output from the photodetector into a voltage signal having a signal voltage corresponding to a frequency of the electrical signal; and
one or more processors configured to:
measure, as a characteristic value of the voltage signal, a slope indicating a relationship between a frequency sweep time of the frequency modulation and the signal voltage;
evaluate whether the characteristic value is within an acceptable range corresponding to a demodulation band of the demodulation circuit; and
change the control parameter when the characteristic value is evaluated not to be within the acceptable range.

10. The laser radar device according to claim 9, wherein:
the modulated light generator is configured to perform the frequency modulation by changing a frequency of the modulated laser light at a specified sweep rate; and
the one or more processors are configured to generate, as the control parameter, a control value for changing the specified sweep rate when the characteristic value is evaluated not to be within the acceptable range.

11. The laser radar device according to claim 10, wherein the control value is a value specifying the frequency sweep time.

12. The laser radar device according to claim 9, further comprising a signal processor configured to calculate at least one of a vibration frequency and a displacement amount of the target on a basis of an output of the demodulation circuit.

13. The laser radar device according to claim 9, further comprising an optical delay circuit which includes a plurality of optical fiber lines having different optical path lengths and is interposed in an optical path between the optical splitter and the optical combiner, wherein:
the one or more processors are configured to measure the distance to the target on a basis of the voltage signal; and
the optical delay circuit is configured to select an optical fiber line corresponding to a measured value of the distance from among the plurality of optical fiber lines, and connect between the optical splitter and the optical combiner through the selected optical fiber line.

14. The laser radar device according to claim 13, wherein the optical delay circuit is configured to select an optical fiber line from among the plurality of optical fiber lines, thereby equating a length of an optical path starting from the optical splitter and ending at the optical combiner via the target, to a length of an optical path starting from the optical splitter and ending at the optical combiner via the optical delay circuit.

15. The laser radar device according to claim 13, wherein the optical delay circuit includes:
a driver circuit configured to designate an optical fiber line corresponding to the measured value of the distance from among the plurality of optical fiber lines; and an optical switch configured to allow light to pass through the designated optical fiber line and shut off light that passes through one or more optical fiber lines other than the designated optical fiber line among the plurality of optical fiber lines.

* * * * *